United States Patent Office 2,733,282
Patented Jan. 31, 1956

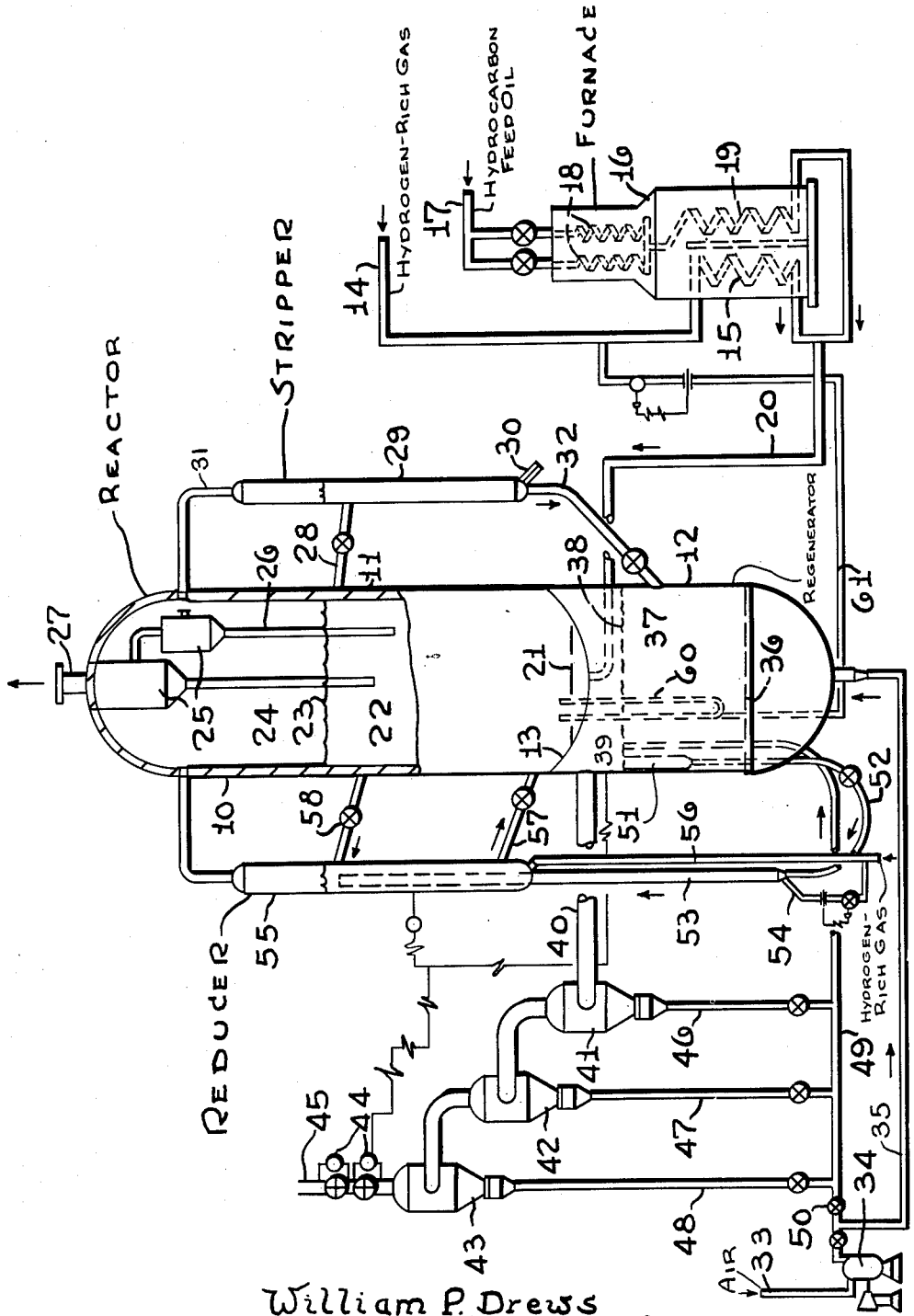

2,733,282

FLUIDIZED SOLIDS REACTOR SYSTEM

William P. Drews, Elizabeth, Arnold F. Kaulakis, Chatham, and Warren K. Lewis, Jr., Elizabeth, N. J., assignors to Esso Research and Engineering Company, a corporation of Delaware Application July 31, 1952, Serial No. 301,915

6 Claims. (Cl. 260—673.5)

This invention relates to the catalytic conversion of hydrocarbons and particularly to a process and apparatus whereby hydrocarbon fractions can be advantageously converted into products rich in aromatics by the fluidized solids technique.

It is known that petroleum naphthas can be subjected to reforming operations to yield liquid products boiling within the motor fuel or gasoline range and possessing increased amounts of aromatics and improved octane numbers. Reforming operations employing solid catalysts, especially hydroforming and aromatization processes are widely used in the petroleum industry. By hydroforming is ordinarily meant a process wherein hydrocarbon fractions boiling within the motor fuel or naphtha range are treated at elevated temperatures and pressures in the presence of certain solid catalysts and hydrogen whereby the hydrocarbon fraction is increased in aromaticity with no net consumption of hydrogen. The term "aromatization" when used broadly refers to conversions which increase the aromaticity of the hydrocarbon fractions treated. As generally used in the petroleum industry, aromatization is a process in which hydrocarbon fractions are treated at elevated temperatures in the presence of solid catalysts and in the presence or absence of hydrogen, usually at pressures lower than those employed in hydroforming, for the purpose of increasing the aromaticity of the hydrocarbon fraction.

Catalytic reforming processes are usually carried out at temperatures of about 750–1150° F. in the pressure range of about 0–3000 lbs. per sq. inch and in the presence of such catalysts as molybdenum oxide, chromium oxide, nickel oxide, or in general oxides or sulfides of metals of groups IV, V, VI and VIII of the periodic system. These catalytic materials are ordinarily dispersed or supported on a base or spacing agent. Commonly used spacing agents for this type of catalysts are alumina, ether precipitated or of the gel type, activated alumina and zinc aluminate spinels.

It has been proposed in application Serial No. 188,236, filed October 3, 1950, now U. S. Patent No. 2,689,823, to effect the hydroforming of naphtha fractions in a fluidized solids reactor system in which naphtha vapors are passed through a dense, fluidized bed of hydroforming catalyst particles in a reaction zone, spent catalyst particles being withdrawn continuously from the dense bed and passed to a separate regeneration zone where inactivating carbonaceous deposits are removed, whereupon the regenerated catalyst particles are returned to the main reactor vessel. Fluid hydroforming as thus conducted has several fundamental advantages over fixed bed hydroforming such as (1) the operations are continuous, (2) the vessels and equipment can be designed for single rather than dual functions, (3) the reactor temperature is substantially constant throughout the reactor bed, and (4) the regeneration or reconditioning of the catalyst may be readily controlled.

A particular advantage of the foregoing fluid solids operation has been the fact that the freshly regenerated catalyst can be utilized to carry part of the necessary heat requirements for the hydroforming reaction from the regeneration zone into the reaction zone. It has been proposed in this connection to discharge hot, freshly regenerated catalyst particles from the regenerated catalyst standpipe into a stream of hot, hydrogen-rich recycle gas in a transfer line whereby the catalyst particles are subjected, during their passage through the transfer line into the reaction zone, to a reconditioning treatment involving at least a partial reduction of higher oxides of the catalytic metal formed during regeneration into a more catalytically active form of lower oxide of the catalytic metal. In view of the high temperature of the freshly regenerated catalyst (1050–1200° F.) and the exothermic nature of the reaction between the hot, freshly regenerated catalyst and the hydrogen-rich gas, it is necessary to make the transfer line of small diameter and as short as possible in order to keep the time of contact of the regenerated catalyst and the hydrogen-containing gas sufficiently short to avoid overtreatment and/or thermal degradation of the catalyst.

Operations of this type have been limited to low catalyst-to-oil ratios (around 1:1) by selectivity considerations since higher ratios resulted in excessive carbon formation. For example, an increase in catalyst/oil ratio from 1.4 to 10.0 will increase carbon formation by roughly 5.0 wt. percent on feed and hence decrease the yield of desirable product in the same proportion. There will probably be a still further decrease in product yield, owing to the chemisorption of product on catalyst in the reactor. Moreover, increase in the circulation of catalyst increases the amount of air consumed in the regenerator, due partly to oxidation of the catalyst to a higher valence state and partly to chemisorption of oxygen on catalyst in the regenerator. Another disadvantage of high catalyst circulation is that a large amount of water is formed in the reducer which water is difficult to strip completely from the catalyst. If the water is not stripped thoroughly before the catalyst enters the reactor, conversion is considerably reduced. However, low catalyst-to-oil ratios limit the transfer of heat from the regenerator to the reactor via the catalyst and make it necessary to provide cooling coils in the regenerator and to provide furnaces or other means for supplying heat to the reactor either directly or indirectly through the reactants and/or the hydrogen-rich recycle gas. In general, the heat carrying capacity of the reactants and recycle gas is sufficiently low that a large fraction of the requisite heat must be supplied to the reactor directly.

It is the object of this invention to provide an improved process and apparatus for reforming hydrocarbon fractions by the fluidized solids technique.

It is also the object of this invention to provide a process and apparatus for reforming hydrocarbon fractions by the fluidized solids technique in which catalyst circulation is minimized.

It is a further object of this invention to provide a process and apparatus for reforming hydrocarbons fractions by the fluidized solids technique in which maximum amounts of heat released in the regeneration and pretreatment of the catalyst is transferred to the reaction zone.

A further object of this invention is to provide a process and apparatus for the production of benzene by the aromatization of hexane-containing feed stocks. These and other objects will appear more clearly from the detailed specification and claims which follow.

In accordance with the present invention, the reactor is arranged directly above the regenerator, forming in effect a one vessel system. Dense, fluidized, liquid-simulating beds of finely divided catalyst particles are maintained in the reactor and in the regenerator and heat is transferred from the regenerator to the reactor through the base of the reactor and by means of hairpin heat transfer tubes extending downward from the base of the reactor and submerged in the dense bed within the regenerator. Reactor catalyst is circulated through these hairpin tubes to pick up heat from the combustion of the carbonaceous deposits on the catalyst and the heated reactor catalyst is then returned to the dense bed in the reactor to satisfy the reactor heat requirements. Heat balance is maintained by preheating the feed stock and hydrogen-rich or recycle process gas and by controlling the rate of circulation of the reactor catalyst through the hairpin tubes by adjusting the aeration gas rate in the riser legs of the hairpin tubes. Catalyst is circulated from the reactor to the regenerator at a rate determined by permissible carbon buildup. Cyclone separators or other means for the recovery of catalyst from the regeneration or flue gases are advantageously arranged externally of the regenerator vessel and the cyclone fines are returned to the regenerator dense bed through a dilute phase riser rather than by a conventional dense phase dip leg system. The regenerated catalyst leaves the regenerator by overflow into an outlet well and is delivered to a reducer or pretreater where it is mixed with reactor catalyst for controlling catalyst temperature during pretreatment and contacted with hydrogen or hydrogen-rich gas whereupon the catalyst is returned to the reactor dense bed.

Reference is made to the accompanying drawing illustrating diagrammatically a reactor-regenerator system in accordance with the present invention.

In the drawing, 10 is a long, vertical shell enclosing an upper reactor zone 11 and a lower regenerator zone 12. An essentially horizontal base or partition 13 separates the upper reactor zone 11 from the lower regeneration zone 12. Hydrogen-rich gas, preferably gas separated from the reaction products formed in the system is supplied from suitable storage means through inlet line 14 to a preheating coil 15 in preheat furnace 16. The hydrocarbon or naphtha feed stock is supplied through supply line 17 and is passed through preheating coils 18 and 19 in preheat furnace 16. The preheated hydrogen-rich gas and hydrocarbon feed stock are desirably combined in feed inlet line 20 and conducted into the bottom of the reactor zone 11. A perforated plate or grid 21 is preferably arranged across the bottom of the reactor zone in order to distribute the incoming vapors and gases uniformly over the entire cross-section of the reactor zone. Instead of supplying the hydrogen-rich gas and hydrocarbon feed together, as shown, they may also be introduced separately as by introducing the hydrogen-rich gas below the grid 21 and by introducing the hydrocarbon feed through distributor rings or nozzles arranged above or below the grid 21.

Catalyst is supplied to the reactor zone in finely divided condition and is maintained as a dense, fluidized liquid simulating bed 22 having a definite level 23 by control of the velocity of the gaseous reactants passing upwardly through the reactor zone. The vaporous reaction products leaving the dense bed 22 entrain a small amount of catalyst particles forming a dilute phase or suspension 24 in the upper part of the reactor zone. The reaction products and entrained catalyst particles are passed through separating means 25 or the like arranged in the upper part of the reactor. The separating means, which may be cyclone separators or the like, separates the vaporous reaction products from the catalyst particles. The solid catalyst particles separated in cyclones 25 are returned to the dense bed 22 through the dip legs or pipes 26. Valve or damper means and fluidizing gas inlet lines may be provided in the dip pipes 26 to control the return of the separated or recovered catalyst particles to the dense bed 22. The vaporous reaction products leaving the separating means 25 pass overhead through outlet line 27 to suitable product recovery, processing and/or storage equipment.

Catalyst particles flow from dense bed 22 through connector pipe 28 into standpipe stripper 29. Stripping gas such as steam or the like is introduced into the lower part of standpipe stripper 29 as through inlet line 30. The stripping gas passes countercurrent to the descending catalyst particles and strips off entrained or adsorbed hydrogen and light hydrocarbons which pass overhead from stripper 29 through connector line 31 into the dilute phase 24 in the upper part of the reactor.

The stripped, spent catalyst particles are discharged from the bottom of the standpipe stripper 29 through line 32, which may be equipped with a slide valve for control or emergency cut-off purposes, into the regenerator zone 12. Regeneration gas or air supplied through 33 is compressed in blower 34 and passed through line 35 into the bottom of the regenerator zone 12. A perforated plate or grid 36 is preferably provided in the lower part of regenerator zone 12 to insure uniform distribution of the regeneration gas over the entire cross section of the regenerator zone. The velocity of the regeneration gas through the regenerator zone is so controlled as to form a dense, fluidized bed 37 having a definite level 38. The regeneration gases leaving the dense bed 37 carry small amounts of catalyst particles along forming a dilute or disperse phase 39 in the upper part of the regeneration zone. The regeneration gases are taken through outlet line 40 to a cyclone separator or the like where entrained catalyst particles are separated from the regeneration gases. In the system shown, volume and material considerations, particularly with respect to the hairpin tubes 60, make it necessary to reduce regenerator outage to the minimum and to arrange the regenerator cyclones outside the vessel. A suitable arrangement of three stage external cyclones 41, 42 and 43 is shown. Regeneration gases are discharged from cyclone 43 through pressure control valves 44 to a flue or stack 45. Dip legs 46, 47 and 48 are connected to the bottom of cyclone separators 41, 42 and 43 respectively for discharging the separated catalyst or cyclone fines into transfer line 49. In accordance with the present invention, a dilute phase riser is utilized to return cyclone fines to the regenerator dense bed 37. Accordingly, a small quantity of air from compressor 34 is discharged through valve controlled connection 50 in order to convey the fines discharged from the dip legs through transfer line and riser 49 and back into the regenerator dense bed. If a conventional dense phase dip leg system had been used, the cyclone separators would have to be mounted much higher, necessitating much more structural work and a long, hot regenerator flue gas line of large diameter.

Regenerated catalyst leaves the regenerator by overflow from the dense bed 37 into the outlet well 51 and is delivered through a U-bend 52 to a dilute phase riser 53 where it is picked up by a stream of carrier gas, preferably hydrogen-rich or recycle gas supplied at 54 and conveyed into reducer or pretreater 55. In the reducer 55 the catalyst flows downwardly countercurrent to the main stream of hydrogen-containing gas supplied through inlet line 56 and is removed to the reactor through a dense phase transfer line 57 at the bottom.

Since the freshly regenerated catalyst is supplied to the reducer at substantially regenerator temperature of about 1100–1200° F. and since the reducing reaction is exothermic, some provision should be made for removing excess heat from the reducer. This may be advantageously accomplished by providing a valve controlled transfer line 58 into which reactor catalyst may flow from the dense bed 22. Lift gas, for example a side stream of reducing gas from supply line 56 may be introduced into transfer line 58 to convey the stream of reactor catalyst into the reducer or pretreater 55.

In order to minimize catalyst circulation from the reactor to the regenerator thence to the reducer and back into the reactor and at the same time supply the necessary heat of reaction to the reactor without excessive heating of naphtha feed and recycle gas, provision is made for the transfer of heat from the regenerator into the reactor. This may be accomplished by means of hairpin tubes 60 extending from just above the distributor grid 21 near the bottom of the reactor downward deep into the dense fluidized bed 37 in the regenerator. Catalyst flows from the dense bed 22 down through one leg of the hairpin tube and is conveyed through the other leg of the hairpin tube by a stream of lift gas, for example a small stream of recycle gas supplied through line 61. Intervessel heat balance is maintained by controlling the catalyst rate through the hairpin tubes by the aeration or lift gas rate. In a reactor-regenerator system in accordance with this invention capable of handling about 6800 barrels of feed per day, the reactor and regenerator zones would be approximately 24½ feet in diameter and roughly 76 feet high. In order to provide adequate cooling of the regenerator zone or adequate heating for the reactor zone approximately 156 4-inch inside diameter hairpin tubes could be arranged as shown in the drawing to provide approximately 5150 sq. ft. of submerged area. Circulation of the reactor catalyst through the hairpin tubes can be readily effected by by-passing about 10% of the recycle gas around the preheat furnace and supplying this gas directly to the upflow legs of the hairpin tubes. Adequate circulation can ordinarily be effected by supplying aeration gas in sufficient amount that the gas velocity would be about 6.0 ft. per second which, with a slip factor of 2 give a catalyst velocity of 3 ft. per second.

The reactor-regenerator catalyst circulation rate is determined by permissible carbon buildup on the reactor catalyst and amounts to only about one tenth of that required if the only means of heat transfer between the reactor and the regenerator were the intervessel circulation. Reduction of this circulation results in a saving on stripping steam, regeneration air and reducing gas as well as a reduction in size of the stripper, reducer, and circulating lines and valves.

The feed or charging stock to the reforming reactor may be a virgin naphtha, a cracked naphtha, a Fischer-Tropsch naphtha or the like having a boiling range of from about 130–430° F. or a narrow boiling fraction within this range, for example a fraction boiling between 130 and 185° F. The feed stock is preheated alone or in admixture with hydrogen-rich recycle gas to reaction temperature or to the maximum temperature possible while avoiding thermal degradation of the feed stock. Ordinarily, preheating of the feed stock is carried out to temperatures of about 800–1050° F., preferably about 1000° F. The naphtha preheat can be carried out to high temperatures while avoiding thermal degradation thereof by limiting time of residence of the feed stock in the preheat furnace and in the transfer and feed inlet lines. The hydrogen-rich or recycle process gas which contains from about 50 to 80 volume per cent or more of hydrogen, is preheated to temperatures of about 1150–1300° F., preferably about 1200° F., prior to the introduction thereof into the inlet line. The recycle gas should be circulated through the reactor zone at a rate of from about 1000–8000 cu. ft. per barrel of feed. The amount of recycle gas used is preferably the minimum amount which will suffice to keep carbon formation at a low level.

The reactor system is charged with a mass of finely divided reforming catalyst. Suitable catalysts include platinum, palladium and group VI metal oxides such as molybdenum oxide, chromium oxide or tungsten oxide or mixtures thereof upon a carrier such as activated alumina, zinc aluminate spinel or the like. Preferred catalysts contain about 5 to 15 wt. per cent molybdenum oxide or from about 10 to 40 wt. per cent chromium oxide upon a suitable carrier. The precious metal catalysts contain from about 0.01 to 1.0 wt. per cent of platinum or about 0.03 to 3.0 wt. per cent of palladium upon a suitable support. If desired, minor amounts of stabilizers and promoters such as silica, calcium oxide, ceria or potassia can be included in the catalyst. The catalyst particles are, for the most part, between 200 and 400 mesh in size or about 0–200 microns in diameter with a major proportion between 20 and 80 microns.

The reforming reactor zone should be operated at temperatures between 800° F. and 1150° F. and at pressures between about 5 and 500 lbs. per sq. inch. The particular temperature and pressure used is governed principally by the nature of the feed stock and the nature of the end product desired. For example, a narrow boiling hexane-rich fraction is preferably reformed in contact with a chromium oxide-alumina or chromium oxide-zinc aluminate spinel catalyst at temperatures of about 1000–1025° F. and at pressures of about 10–50 lbs. per sq. inch gauge while a 200–350° F. boiling range naphtha is preferably reformed in contact with a molybdenum oxide-alumina catalyst at temperatures of about 900–925° F. and at pressures of about 200 lbs. per sq. inch gauge. Lowering reactor pressure ordinarily results in increased carbon formation while increasing reactor pressures results in an increase in catalyst selectivity to light products ($C_4$ and lighter). The regenerator zone is normally operated at temperatures of about 1050–1200° F. and at essentially the same pressure as the reactor zone to facilitate flow between the several vessels or zones. The residence time of the catalyst in the reactor is of the order of from about 1.0 to about 10 hours and in the regenerator of from about 0.5 to 6 hours. Regeneration is ordinarily conducted with an excess of air or with such an amount of air that there will be some free oxygen in the flue gases from the regenerator and in the case of a group VI metal oxide catalyst, the catalyst will be converted to a higher oxide during regeneration.

The weight ratio of catalyst to oil introduced into the reactor should be about 0.3 to 3.0. Space velocity or the weight in pounds of feed charged per hour per pound of catalyst in the reactor depends upon the age or activity level of the catalyst, the character of the feed stock and the desired octane number of the product. Space velocity for molybdenum oxide on alumina gel or a chromia-alumina catalyst may vary, for example, from about 1.5 wt./hr./wt. to about 0.05 wt./hr./wt.

The temperature in the regenerator zone is maintained between about 1050 and 1200° F., preferably at the maximum temperature that the catalyst can withstand in order that a maximum amount of heat can be transferred to the reaction zone. The reduction of the higher catalytic metal oxides formed in the regenerator is highly exothermic and results in a temperature rise which may be of the order of about 120° F. The temperature rise during reduction is dependent upon the nature of the catalyst, i.e. whether a chromium oxide- or a molybdenum oxide-containing catalyst as well as upon the amount of catalytic metal oxide present in the catalyst. In the event that hydrogen-containing gas is supplied through line 54 to lift regenerated catalyst through regenerated catalyst riser line 53, it should be supplied at such a rate as to convey the regenerated catalyst as rapidly as possible into the pretreater or reducer 55, preferably in a matter of about 2 to 5 seconds. It is also necessary to supply reactor catalyst to the pretreater-reducer 55 at a sufficient rate to absorb the heat of reduction of the regenerated catalyst. The ratio of reactor catalyst to regenerated catalyst supplied to the pretreater-reducer will vary somewhat depending upon the temperature at which the reactor zone is operated or upon the spread or difference between the temperature maintained in the regenerator zone and the reactor zone. The amount of reactor catalyst supplied to the pretreater-reducer should be sufficient to prevent a temperature rise of more than a few degrees, preferably not more than 10° F. above the regenerator temperature. The residence time of the catalyst in the pretreater-reducer may be from about 0.5 to about 180 minutes.

The following example is illustrative of the present invention as applied to the production of benzene.

EXAMPLE

A reactor system as described above is charged with a catalyst containing 29 parts $Cr_2O_3$, 100 parts alumina, 2 parts potassium oxide and 0.86 part of ceria. The system is also charged with 6800 barrels per stream day of a feed stock comprising an isomerized hexane-rich virgin light naphtha (a $C_6$–180° F. fraction) and about 2500 cu. ft. per barrel of liquid feed of recycle gas containing about 70–80 vol. percent hydrogen.

The process conditions are summarized in Table I.

Table I

| | |
|---|---|
| Reactor top, p. s. i. g | 10 |
| Reactor, ° F | 1015 |
| Catalyst/oil ratio | 1.4 |
| Naphtha preheat, ° F | 970 |
| Recycle gas preheat, ° F | 1015 |
| Reactor velocity, ft./sec | 1.8 |
| Stripper, ° F | 1015 |
| Stripper velocity, ft./sec | 2.0 |
| Regenerator top, p. s. i. g | 14.5 |
| Regenerator, ° F | 1175 |
| Regenerator velocity, ft./sec | 0.8 |
| Reducer, ° F | 1175 |
| Reducer velocity, ft./sec | 0.9 |
| Gas velocity in upflow leg of hairpin tubes, ft./sec | 6.0 |

In the foregoing operation, heat requirements are 49.6 MM B. t. u./hr. of which less than 3.0 MM B. t. u./hr. is supplied by preheating feed and recycle gas while the remainder is supplied as sensible heat of the circulating regenerated and tempering catalyst and also reactor catalyst circulated through the hairpin tubes. In general, less than 10% of the heat requirements of the aromatization reaction zone is supplied by feed and recycle gas preheat and more than 90% is supplied as sensible heat in the catalyst and a major proportion of the latter is introduced by circulating streams of reactor catalyst in indirect heat exchange relation to the dense bed in the regenerator zone.

Basic yields of this operation are summarized in Table II.

Table II

Yields:

| | |
|---|---|
| Dry gas, wt. percent | 13.0 |
| $C_4$, vol. percent | 4.0 |
| $C_5$+liquid, vol. percent | 69.1 |
| Total benzene, vol. percent | 42.8 |
| Net benzene, vol. percent | 36.8 |
| Coke, wt. percent | 5.5 |

The foregoing description contains a limited number of embodiments of the present invention. It will be understood, however, that numerous variations or modifications may be made by those skilled in this art without departing from the scope of this invention.

What is claimed is:

1. A method for reforming hydrocarbons which comprises passing preheated hydrocarbon feed vapors and preheated hydrogen-rich gas through a dense fluidized bed of reforming catalyst particles in a reaction zone maintained under reforming conditions of temperature and pressure, removing reaction products, substantially free from catalyst particles overhead from the reaction zone, withdrawing spent catalyst particles from the dense, fluidized bed in the reaction zone into a stripping zone, contacting the withdrawn spent catalyst particles in the stripping zone with a stripping gas to remove hydrocarbons and hydrogen from said catalyst particles, discharging stripped catalyst particles into a separate regeneration zone, passing air through a dense fluidized bed of catalyst particles in the regeneration zone in order to burn carbonaceous deposits from the catalyst particles, withdrawing regenerated catalyst particles from the regeneration zone into a separate reducing-pretreating zone, withdrawing a stream of reactor catalyst particles from the reaction zone and mixing the reactor catalyst particles with the regenerated catalyst particles in the reducing-pretreating zone, passing hydrogen-rich gas through the resultant mixture of regenerated and reactor catalyst and discharging the hydrogen treated mixture of catalyst particles into the reaction zone, withdrawing additional streams of reactor catalyst directly from the dense, fluidized bed in the reaction zone, passing these streams of reactor catalyst in indirect heat exchange relation to the dense, fluidized bed in the regenerator zone in order to raise the temperature of the streams of reactor catalyst and returning the heated streams of reactor catalyst directly to the dense, fluidized bed in the reactor zone.

2. A method for the production of benzene which comprises passing preheated vapors of a $C_6$ to 180° F. boiling range virgin naphtha fraction and preheated hydrogen-rich gas through a dense fluidized bed of a group VI metal oxide aromatization catalyst particles in a reaction zone maintained under aromatization conditions of temperature and pressure, removing reaction products rich in benzene substantially free from catalyst particles overhead from the reaction zone, withdrawing spent catalyst particles from the dense, fluidized bed in the reaction zone into a stripping zone, contacting the withdrawn spent catalyst particles in the stripping zone with a stripping gas to remove hydrocarbons and hydrogen from said catalyst particles, discharging stripped catalyst particles into a separate regeneration zone, passing air through a dense fluidized bed of catalyst particles in the regeneration zone in order to burn carbonaceous deposits from the catalyst particles, withdrawing regenerated catalyst particles from the regeneration zone into a separate reducing-pretreating zone, withdrawing a stream of reactor catalyst particles from the reaction zone and mixing the reactor catalyst particles with the regenerated catalyst particles in the reducing-pretreating zone, passing hydrogen-rich gas through the resultant mixture of regenerated and reactor catalyst and discharging the hydrogen treated mixture of catalyst particles into the reaction zone, withdrawing additional streams of reactor catalyst directly from the dense, fluidized bed in the reaction zone, passing these streams of reactor catalyst in indirect heat exchange relation to the dense, fluidized bed in the regenerator zone in order to raise the temperature of the streams of reactor catalyst and returning the heated streams of reactor catalyst directly to the dense, fluidized bed in the reactor zone.

3. The process as defined in claim 2 in which the catalyst comprises chromium oxide and alumina, the reactor zone is maintained at a pressure of about 10 lbs. per sq. inch gauge and at a temperature of about 1015° F. and the regenerator zone is maintained at a pressure of about 15 lbs. per sq. inch gauge and at a temperature of about 1150–1200° F.

4. The process as defined in claim 3 wherein less than 10% of the heat requirements in the aromatization reaction zone is supplied by preheating the naphtha feed and hydrogen-rich gas and more than 90% of the said heat requirements is supplied by the catalyst.

5. An apparatus for reforming of hydrocarbons comprising a vertical vessel, a reactor zone arranged in the upper part and a regenerator zone arranged in the lower part of said vessel, hairpin tubes having their open ends arranged in the lower part of the reactor zone and extending downward into the regenerator zone, an inlet line connected to one leg of each of said hairpin tubes for the supply of lift gas thereto, an inlet for the supply of regeneration gas to the bottom of the regenerator zone, an outlet line for regeneration gases connected to the upper part of the regenerator zone, means arranged in the outlet line for regeneration gases for separating entrained catalyst particles from the regeneration gases, a transfer line arranged below said separator means extending into the regenerator zone, conduits extending from said separator means for discharging separated catalyst particles into said transfer line, an inlet line for supplying carrying gas to said transfer line for conveying recovered catalyst to the regenerator zone, an outlet well arranged within the regenerator zone for receiving regenerated catalyst, a regenerated catalyst riser line, a U-bend connection between said outlet well and said riser line, an inlet for the supply of lift gas to the bottom of said riser line, a pretreater-reducer surrounding the upper part of said riser line, a connector line for transferring catalyst from the reactor to the pretreater-reducer, an inlet for supplying reducing gas to the bottom of the pretreater-reducer and a connector line between the bottom of the pretreater-reducer and the reactor zone for transferring a mixture of reactor catalyst and pretreated regenerated catalyst to the reactor zone.

6. An apparatus for reforming of hydrocarbons comprising a vertical vessel, a reactor zone arranged in the upper part and a regenerator zone arranged in the lower part of said vessel, hairpin tubes having their open ends arranged in the lower part of the reactor zone and extending downward into the regenerator zone, an inlet line connected to one leg of each of said hairpin tubes for the supply of lift gas thereto, an inlet for the supply of regeneration gas to the bottom of the regenerator zone, an outlet line for regeneration gases connected to the upper part of the regenerator zone, cyclone separator means arranged in the outlet line for regeneration gases for separating entrained catalyst particles from the regeneration gases, a transfer line arranged below the cyclone separator means extending into the regenerator zone, dip legs extending downwardly from the cyclone separator means for discharging separated catalyst particles from the cyclone separating means into said transfer line, an inlet line for supplying carrying gas to said transfer line for conveying recovered catalyst to the regenerator zone, an outlet well arranged within the regenerator zone for receiving regenerated catalyst, a regenerated catalyst riser line, a U-bend connection between said outlet well and said riser line, an inlet for the supply of lift gas to the bottom of said riser line, a pretreater-reducer surrounding the upper part of said riser line, a connector line for transferring catalyst from the reactor to the pretreater-reducer, an inlet for supplying reducing gas to the bottom of the pretreater-reducer and a connector line between the bottom of the pretreater-reducer and the reactor zone for transferring a mixture of reactor catalyst and pretreated regenerated catalyst to the reactor zone.

References Cited in the file of this patent

UNITED STATES PATENTS

| | | |
|---|---|---|
| 2,345,487 | Liedholm | Mar. 28, 1944 |
| 2,348,009 | Johnson et al. | May 2, 1944 |
| 2,358,039 | Thomas et al. | Sept. 12, 1944 |
| 2,421,677 | Belchetz | June 3, 1947 |
| 2,477,750 | Johnson | Aug. 2, 1949 |
| 2,674,612 | Murphree | Apr. 6, 1954 |